United States Patent
Xie et al.

(10) Patent No.: US 11,550,324 B2
(45) Date of Patent: Jan. 10, 2023

(54) PARKING ZONE DETECTION FOR VEHICLES

(71) Applicant: Zoox, Inc., Foster City, CA (US)

(72) Inventors: Zheyuan Xie, Philadelphia, PA (US); Joseph Funke, Redwood City, CA (US); Steven Cheng Qian, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 407 days.

(21) Appl. No.: 16/587,409

(22) Filed: Sep. 30, 2019

(65) Prior Publication Data

US 2021/0096565 A1   Apr. 1, 2021

(51) Int. Cl.
  *G05D 1/02*     (2020.01)
  *G05D 1/00*     (2006.01)
  *G01C 21/34*    (2006.01)

(52) U.S. Cl.
  CPC ......... *G05D 1/0212* (2013.01); *G05D 1/0088* (2013.01); *G01C 21/3476* (2013.01)

(58) Field of Classification Search
  CPC . G05D 1/0212; G05D 1/0088; G01C 21/3476
  See application file for complete search history.

(56) References Cited

U.S. PATENT DOCUMENTS

| | | | |
|---|---|---|---|
| 10,023,231 B2 | 7/2018 | Ramanujam | |
| 10,078,789 B2 | 9/2018 | Gupta et al. | |
| 10,311,731 B1* | 6/2019 | Li | G08G 1/0129 |
| 2019/0286153 A1* | 9/2019 | Rankawat | G06T 7/11 |
| 2020/0377077 A1* | 12/2020 | Nessler | B60Q 5/005 |

OTHER PUBLICATIONS

International Preliminary Report on Patentability for PCT Application No. PCT/US20/53295, dated Apr. 14, 2022, 6 pages.

* cited by examiner

Primary Examiner — Peter D Nolan
Assistant Examiner — Mikko Okechukwu Obioha
(74) Attorney, Agent, or Firm — Lee & Hayes, P.C.

(57) ABSTRACT

Techniques and methods for identifying parking zones. For instance, a vehicle may identify a parking zone located near a destination location for the vehicle. The vehicle may then generate one or more lines representing the parking zone. Additionally, the vehicle may generate polygons representing objects located proximate to the parking zone. The vehicle may then determine whether the one or more lines intersect with one or more of the polygons. If the vehicle determines that the one or more lines intersect with one or more of the polygons, then the vehicle may identify one or more first portions of the parking zone that are occupied by one or more objects and as such, unavailable. Using the one or more first portions, the vehicle may identify one or more second portions of the parking zone that are not occupied by objects and as such, available.

20 Claims, 9 Drawing Sheets

200 ⤳

PARKING ZONE DETECTION FOR VEHICLES

BACKGROUND

An autonomous vehicle may navigate along designated routes or between waypoints. For example, when a control system receives a request from a user device to pick up the user at a location and provide transport to a destination location, the autonomous vehicle may receive, from the control system, instructions to navigate from the pickup location to the destination location. In some circumstances, the autonomous vehicle may be required to park in order to pick the user up at the pickup location or drop the user off at the destination location.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
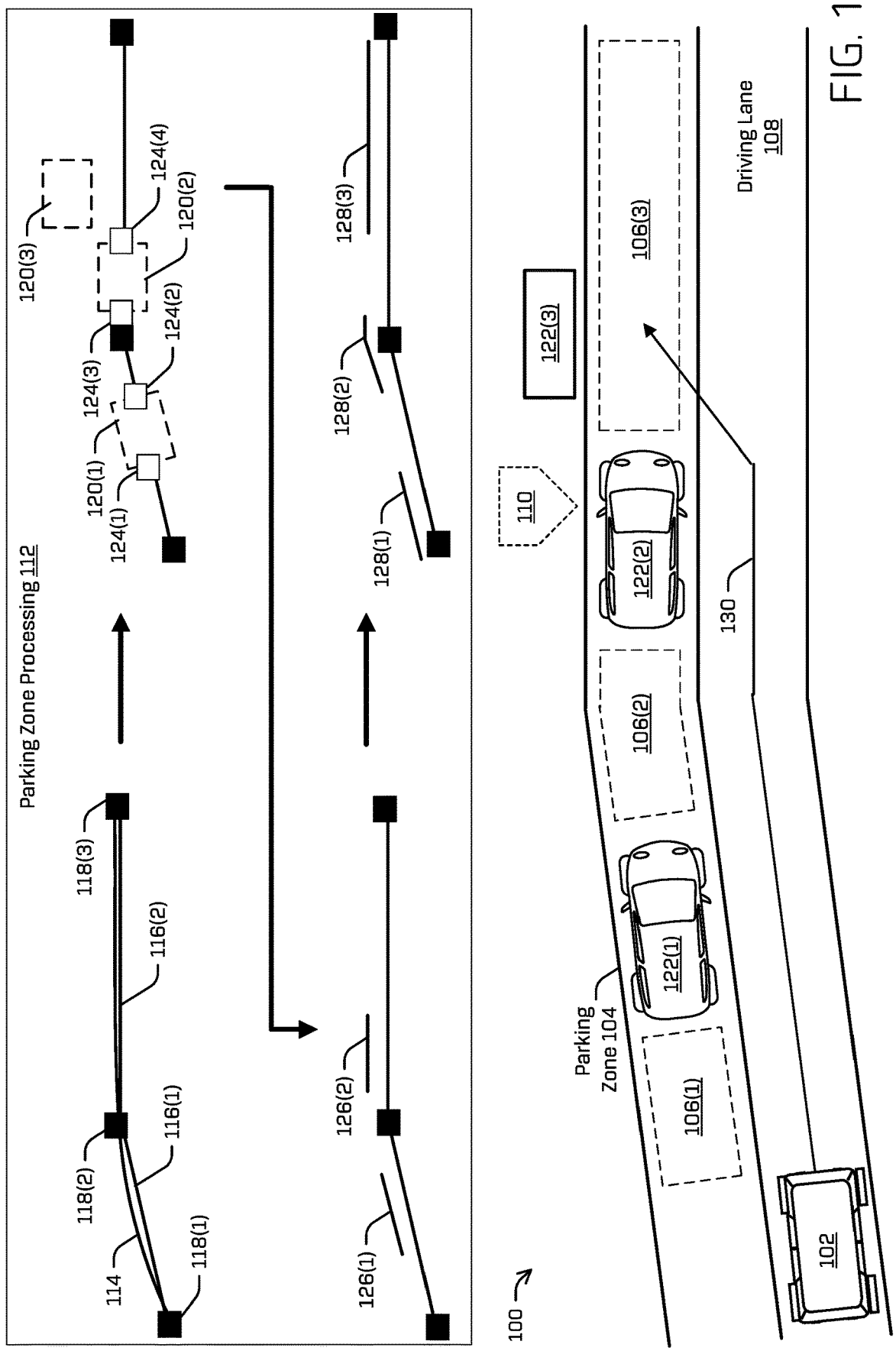
FIG. 1 is an illustration of an environment that includes a vehicle identifying a parking zone and then analyzing the parking zone in order to identify one or more portions of the parking zone that are available for parking the vehicle, in accordance with embodiments of the disclosure.

As discussed above, an autonomous vehicle may navigate along designated routes or between waypoints. For example, when a control system receives a request from a user device to pick up the user at a location and provide transport to a destination location, the autonomous vehicle may receive, from the control system, instructions to navigate from the pickup location to the destination location. In some circumstances, the autonomous vehicle may be required to park in order to pick the user up at the pickup location or drop the user off at the destination location. In some instances, such as when the area of the pickup location and/or destination location includes parking lanes, it may be difficult for the autonomous vehicle to identify a parking space that is both available (e.g., no other vehicles are parked in the parking space) and adequate (e.g., large enough) for the autonomous vehicle.

As such, this disclosure is directed to techniques for identifying parking spaces that are available for autonomous vehicles. For instance, an autonomous vehicle may receive data indicating a location, such as a pickup location, a destination location, and/or the like. While navigating near the location, the autonomous vehicle may identify a parking zone for parking. In some instances, the autonomous vehicle identifies the parking zone using map data that is available to the autonomous vehicle. Additionally, or alternatively, in some instances, the autonomous vehicle identifies the parking zone using sensor data (e.g., cameras, motion detectors, light detection and ranging (LIDAR), radio detection and ranging (RADAR), etc.) generated by one or more sensors of the autonomous vehicle.

The autonomous vehicle may then analyze the parking zone using one or more algorithms in order to identify portion(s) of the parking zone that both available and adequate for the autonomous vehicle. In some instances, a portion of the parking zone may be available when no other objects are located within the portion of the parking zone. As described herein, an object may include, but is not limited to, a vehicle, a person, a bike, a sign, and/or any other type of object. In some instances, a portion of the parking zone may be adequate for the autonomous vehicle when a width of the portion of the parking zone is equal to or greater than a threshold width and/or a length of the portion of the parking zone is equal to or greater than a threshold length. In some examples, the threshold width may include a width of the autonomous vehicle while in other examples, the threshold width may include the width of the autonomous vehicle plus a buffer width. In some examples, the threshold length may include a length of the autonomous vehicle while in other examples, the threshold length may include the length of the autonomous vehicle plus some buffer length. The buffer width and/or the buffer length may be based on a maneuverability of the vehicle.

For example, after identifying the parking zone, the autonomous vehicle may use the sensor data to identify object(s) located proximate to the parking zone. An object may be proximate to the parking zone when the object is located at least partly within the parking zone and/or located within a threshold distance to the parking zone. The threshold distance may include, but is not limited to, one meter, five meters, fifty meters, one hundred meters, and/or any other distance. The autonomous vehicle may then identify portion(s) of the parking zone that are available based on the locations of the object(s).

For example, the autonomous vehicle may generate a line reference that approximates the parking zone. In some instances, the autonomous vehicle generates the line reference as including a line that is located along a middle of the parking zone. However, in other instances, the autonomous vehicle generates the line reference as including a line that is located anywhere within the parking zone. The autonomous vehicle may then sample multiple points located on the line reference and generate line segments that connect the points. In some instances, the autonomous vehicle may use a set number of sample points on the line reference (e.g., two points, five points, ten points, etc.). In some instances, the autonomous vehicle determines the number of sample points based on a length of the line reference. For instance, the autonomous vehicle may use a first number of sample points for a first line reference that includes a first length and use a second, greater number of sample points for a second line reference that includes a second, greater length (e.g., such as may be determined to ensure a certain linear density of such points along the line reference).

The autonomous vehicle may further generate polygon(s) for the object(s) identified as being proximate to the parking zone. In some instances, to generate a polygon for an object, the autonomous vehicle may identify, using the sensor data, various points located around the object, where the points represent a shape of the object. The autonomous vehicle may then dilate the shape in order to generate the polygon. In some instances, the autonomous vehicle dilates the shape based on a width and/or length of the autonomous vehicle. For example, the autonomous vehicle may dilate the width of the object by an amount that is equal to half of the width of the autonomous vehicle.

Additionally, or alternatively, in some instances, the autonomous vehicle may generate shape(s) other than polygon(s) for the object(s) identified as being proximate to the parking zone, where the shape(s) may be referred to as "representation(s)" of the object(s). For example, if the shape of the object does not include a polygon, the autonomous vehicle may generate a representation of the object by dilating the shape of the object in order to generate the representation. In some instances, the representation may have a similar shape as the shape of the object, but be dilated based on at least one of the length or the width of the autonomous vehicle.

The autonomous vehicle may then identify intersections between the line segment(s) and the polygon(s). For example, to identify intersections between a polygon and a line segment, the autonomous vehicle may use one or more algorithms to determine a z-component of a cross-product for each vertex of the polygon, where the z-component indicates which side of the line segment the vertex lies. Next, for each pair of adjacent vertices that are not located on the same side of the line segment (e.g., one vertex includes a negative z-coordinate and a second vertex includes a positive z-coordinate), the autonomous vehicle may use one or more algorithms to determine a position of the intersection between the line segment and an edge that connects the two vertices. The autonomous vehicle may perform similar processes to identify each of the intersections for the polygon(s).

While the above example describes determining the z-components of the cross products for the vertices of the polygon do identify intersections, in other examples, the autonomous vehicle may use one or more additional and/or alternative techniques to identify the intersections. More specifically, the autonomous vehicle may use one or more algorithms to determine that vertices of the polygon are located on opposite sides of the line segment and/or that an edge of the polygon is located on the line segment (for example, by reparameterizing coordinates of the polygon in the route-centric coordinate frame and using the sign of a lateral offset coordinate, including any other method). The autonomous vehicle may then use one or more algorithms to identify the locations of the intersection between the polygon and the line segment.

In some instances, the autonomous vehicle may determine that the line segment(s) do not intersect with a polygon. For example, and when the autonomous vehicle is using the z-components to identify determine if vertices are located on opposite sides of the line segment, the autonomous vehicle may use the one or more algorithms to determine the z-components of the cross-products for the vertices of the polygon. The autonomous vehicle may then determine that the z-components indicate that each of the vertices is located on a same side of the line segment. As such, the autonomous vehicle may determine that the line segment does not intersect with the polygon. In some instances, based on the determination, the autonomous vehicle may determine that the object associated with the polygon is located outside of the parking zone.

The autonomous vehicle may then use the intersections to identify the portion(s) (referred to as "first portion(s)") of the parking zone that are unavailable. For example, to identify a first portion of the parking zone, the autonomous vehicle may identify two or more intersections associated with a polygon. The autonomous vehicle may then determine a first distance along the line segment and/or the line reference at which a closest of the two or more intersections occurs and a second, longer distance along the line segment and/or the line reference at which a furthest of the two or more intersections occurs. As described herein, a distance along the line segment and/or the line reference may be from the current location of the autonomous vehicle. The autonomous vehicle may then identify the first portion of the parking zone as being between the first distance and the second distance. The autonomous vehicle may perform similar processes to identify the first portion(s) for each of the polygon(s) that intersect with the line segment.

The autonomous vehicle may then identify the portion(s) (referred to as "second portion(s)") of the parking zone that are available. In some instances, the autonomous vehicle identifies the second portion(s) as the inverse of the first portion(s). In some instances, the autonomous vehicle then determines, for each second portion of the parking zone, whether a length of the second portion of the parking zone is equal to or greater than the threshold length and/or whether a width of the second portion of the parking zone is equal to or greater than the threshold width. These portion(s) (referred to as "third portion(s)") of the parking zone may then be adequate for the autonomous vehicle to park.

In some instances, when the autonomous vehicle identifies more than one third portion of the parking zone, the autonomous vehicle may perform one or more additional analyses to select a third portion of the parking zone for parking. For example, the autonomous vehicle may determine one or more factors for the third portions of the parking zones. The one or more factors for a third portion of the parking zone may include, but are not limited to, a length of the third portion of the parking zone, a width of the third portion of the parking zone, a distance between the third portion of the parking zone and the location for which the autonomous vehicle is navigating, a maneuverability of the autonomous vehicle to park within the third portion of the parking zone, a speed limit associated with a drive area next to the third portion of the parking zone, a speed at which other vehicles are navigating in the drive area next to the third portion of the parking zone, whether the third portion of the parking zone is secluded, and/or the like. The autonomous vehicle may then select a third portion of the parking zone based on the one or more factors.

For a first example, the autonomous vehicle may select the third portion of the parking zone that is the closest to the location at which the autonomous vehicle is navigating. For a second example, the autonomous vehicle may select the third portion of the parking zone that includes the longest length. While these are just a couple techniques for the autonomous vehicle selecting the third portion of the parking zone, in other examples, the autonomous vehicle may select the third portion of the parking zone using additional and/or alternative techniques. In some instances, after selecting the third portion of the parking zone, the autonomous vehicle may navigate to and then park within the third portion of the parking zone.

In some instances, the autonomous vehicle may perform similar processes to determine whether the autonomous vehicle is able to park within a single parking spot. For instance, the autonomous vehicle may identify a parking spot between two objects, such as two other vehicles. In some instances, the autonomous vehicle identifies the parking spot using the map data that is available to the autonomous vehicle. Additionally, or alternatively, in some instances, the autonomous vehicle identifies the parking spot using the sensor data generated by the autonomous vehicle. In either instance, the autonomous vehicle may then determine whether the autonomous vehicle is able to maneuver in order to park within the parking spot.

For example, the autonomous vehicle may generate one or more line segments representing how the autonomous vehicle is to maneuver to park within the parking spot and/or maneuver to exit the parking spot. In some instances, the one or more line segments may include a first line segment representing the autonomous vehicle entering the parking spot (e.g., an entry leg), a second line segment representing the parking spot (e.g., a parking leg), and a third line segment representing the autonomous vehicle exiting the parking spot (e.g., an exit leg). The autonomous vehicle may then generate polygon(s) (and/or other representation(s)) representing objects that are located proximate to the parking spot. Additionally, the autonomous vehicle may determine whether one or more of the line segment(s) intersect with the polygon(s), using the techniques described herein.

In some instances, if the autonomous vehicle determines that one or more of the line segment(s) intersect with the polygon(s), the autonomous vehicle may determine that the parking spot is unavailable (e.g., the autonomous vehicle cannot park within the parking spot). However, if the autonomous vehicle determines that one or more of the line segment(s) do not intersect with the polygon(s), the autonomous vehicle may determine that the parking spot is available (e.g., the autonomous vehicle can park within the parking spot). The autonomous vehicle may then park within the parking spot.

Although the above examples describe identifying portion (s) of a parking zone for parking the autonomous vehicle, in other examples, similar processes may be performed in order to navigate the autonomous vehicle along a trajectory. For example, the autonomous vehicle may perform similar processes in order to identify available potions of a driving lane, such as then the autonomous vehicle is trying to switch lanes.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data). Additionally, the techniques described herein may be used with real data (e.g., captured using sensor(s)), simulated data (e.g., generated by a simulator), or any combination of the two.

FIG. 1 is an illustration of an environment 100 that includes a vehicle 102 identifying a parking zone 104 within the environment 100 and then analyzing the parking zone in order to identify portion 106(1)-(3) (also referred to as "portions 106") of the parking zone 104 that are available for parking the vehicle 102, in accordance with embodiments of the disclosure. For example, the vehicle 102 may be navigating along a driving lane 108 and towards a location 110. While navigating, the vehicle 102 may identify the parking zone 104. In some instances, the vehicle 102 identifies the parking zone 104 using map data that is available to the vehicle 102, where the map data indicates the location of the parking zone 104. Additionally, or alternatively, in some instances, the vehicle 102 identifies the parking zone 104 using sensor data generated by one or more sensors of the vehicle 102.

The vehicle 102 may then analyze the parking zone 104 in order to identify the portions 106 of the parking zone 104 that are available for parking. For example, and as illustrated in the parking zone processing 112 above, the vehicle 102 may initially generate a line reference 114 representing the parking zone 104. In some instances, the line reference 114 is an arc length indexed trajectory of the parking zone 104. The vehicle 102 may then generate line segments 116(1)-(2) (also referred to as "line segments 116") that approximate the line reference 114. In the example of FIG. 1, there are two line segments 116 based on three points 118(1)-(3) (also referred to as "points 118") sampled along the line reference 114. The points 118 may represent distances along the line reference 114.

Next, the vehicle 102 may generate polygons 120(1)-(3) (also referred to as "polygons 120") representing objects 122(1)-(3) (also referred to as "objects 122") located within the environment 100. In some instances, the vehicle 102 generates the polygons 120 by dilating shapes of the objects 122 by a given amount. For example, the vehicle 102 may generate the polygons 120 by dilating the shapes of the objects 122 by half of the width of the vehicle 102. In some instances, the vehicle 102 dilates the shapes of the objects 122 in two directions. For instance, if the objects 122 are other vehicles, then the vehicle 102 may dilate each side of the widths of the other vehicles by half of the width of the vehicle 102. Additionally, or alternatively, in some examples, the vehicle 102 may generate the polygons 120 by dilating the shapes of the objects 122 by half of the length of the vehicle 102. For instance, and again in the objects 122 are other vehicles, then the vehicle 102 may dilate each side of the lengths of the other vehicles by half of the length of the vehicle 102.

Figure 3:
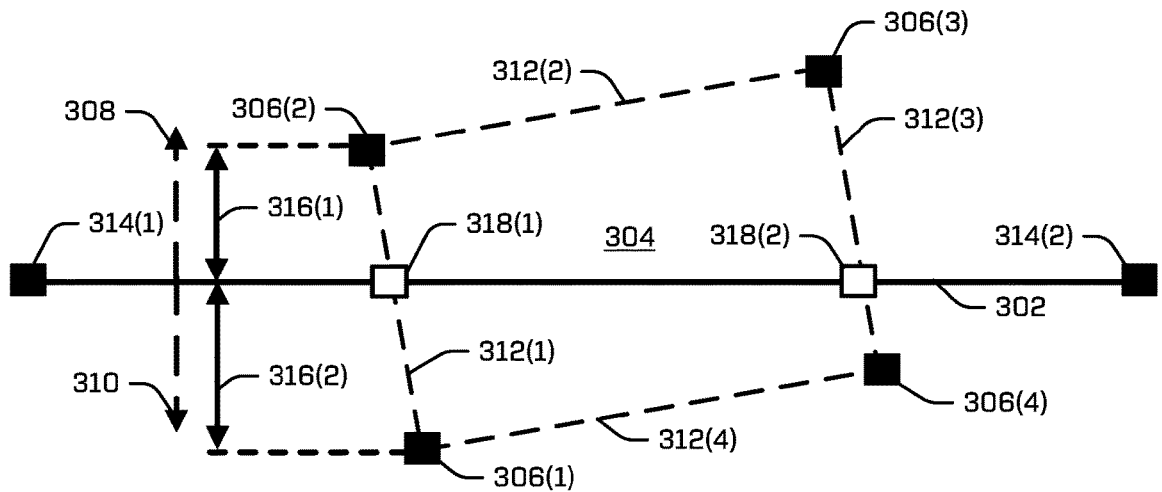
FIG. 3 illustrates an example of identifying intersections between a line segment and a polygon associated with an object, in accordance with embodiments of the disclosure.

The vehicle 102 may then identify intersections 124(1)-(4) (also referred to as "intersections 124") between the line segments 116 and the polygons 120, which is described in detail with regard to FIG. 3. The positions of the intersections 124 are then converted into arc lengths on the line reference 114. Next, the vehicle 102 uses the intersections 124 to identify portions 126(1)-(2) (also referred to as "portions 126") of the line segments 116 and/or the line reference 114 that represent occupied and/or unavailable portions of the parking zone 104. For instance, as shown in the example of FIG. 1, the portion 126(1) represents the area occupied by the object 122(1) and the portion 126(2) represents the area occupied by the object 122(2). However, since the polygon 120(3) does not intersect with the line segments 116, there is not a portion representing the area occupied by the object 122(3).

Next, the vehicle 102 takes the inverse of the portions 126 that are occupied in order to determine portions 128(1)-(3) (also referred to as "portions 128") of the line segments 116 and/or the line reference 114 that represent the portions 106 of the parking zone 104. For instance, the portion 128(1) of the line segments 116 and/or the line reference 114 may represent the portion 106(1) of the parking zone 104, the portion 128(2) of the line segments 116 and/or the line reference 114 may represent the portion 106(2) of the parking zone 104, and the portion 128(3) of the line segments 116 and/or the line reference 114 may represent the portion 106(3) of the parking zone 104.

In some instances, the vehicle 102 may then determine which portions 106 are valid for parking the vehicle 102. For example, the vehicle 102 may determine which portions 106 include sufficient length and/or width for parking the vehicle 102. In some examples, to make the determination, the vehicle 102 may determine the lengths and/or width of the portions 106. The vehicle 102 may then determine whether the lengths are equal to greater than a threshold length and/or whether the widths are equal to or greater than a threshold width. The portions 106 that include lengths that are equal to or greater than the threshold length and widths that are equal to or greater than the threshold widths may be valid for parking the vehicle 102. In the example of FIG. 1, the portion 106(1) and the portion 106(3) may be valid for parking the vehicle 102, and the portion 106(2) may be invalid for parking the vehicle 102.

In some instances, the vehicle 102 may then select one of the portion 106(1) or the portion 106(3) for parking the vehicle 102. For example, the vehicle 102 may determine one or more first factors for the portion 106(1) and one or more second factors for the portion 106(3). The one or more first factors may include, but are not limited to, a length of the portion 106(1), a distance between the portion 106(1) and the location 110, a width of the portion 106(1), and/or the like. Additionally, the one or more second factors may include, but are not limited to, a length of the portion 106(3), a distance between the portion 106(3) and the location 110, a width of the portion 106(3), and/or the like. The vehicle 102 may then use the one or more first factors and the one or more second factors to select the portion 106(3).

For a first example, the vehicle 102 may select the portion 106(3) of the parking zone 104 since the distance between the portion 106(3) and the location 110 is less than the distance between the portion 106(1) and the location 110. For a second example, the vehicle 102 may select the portion 106(3) of the parking zone 104 since the length of the portion 106(3) is greater than the length of the portion 106(1). While these are just a couple techniques for the vehicle 102 selecting the portion 106(3) of the parking zone 104, in other examples, the vehicle 102 may select the portion 106(3) of the parking zone 104 using additional and/or alternative techniques. In some instances, after selecting the portion 106(3) of the parking zone 104, the vehicle 102 may navigate to and then park within the portion 106(3) of the parking zone 104, which is illustrated by 130.

FIGS. 2A-2C, 7, and 8 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 2A:
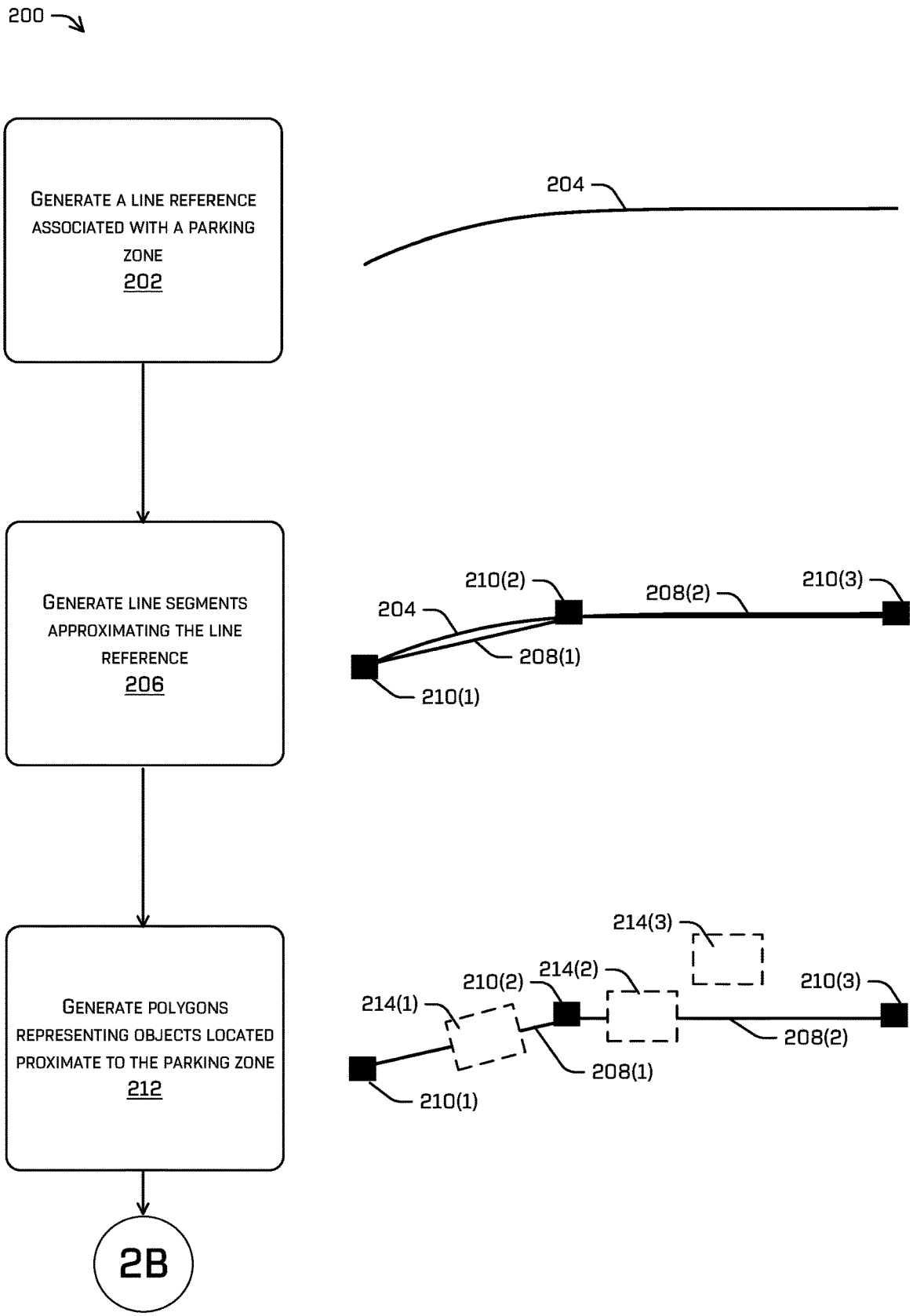
FIGS. 2A-2C depict an example process for analyzing a parking zone in order to identify one or more portions of the parking zone that are available for parking a vehicle, in accordance with embodiments of the disclosure.
Figure 2B:
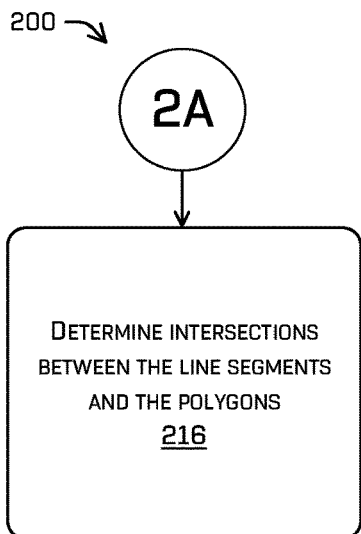
Figure 2B:
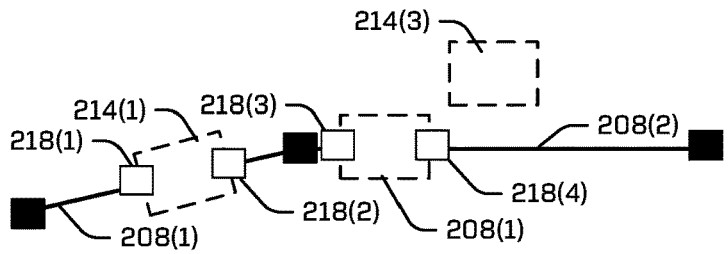
Figure 2B:
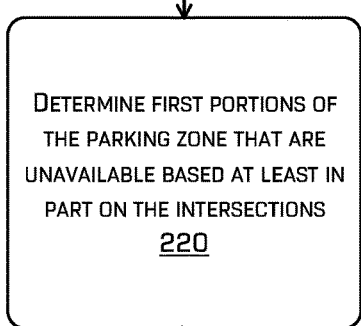
Figure 2B:
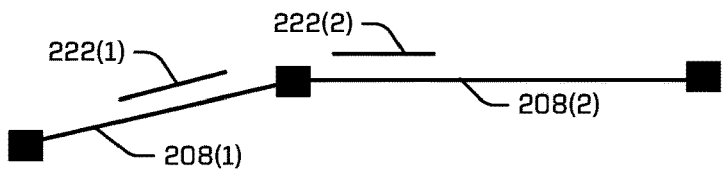
Figure 2B:
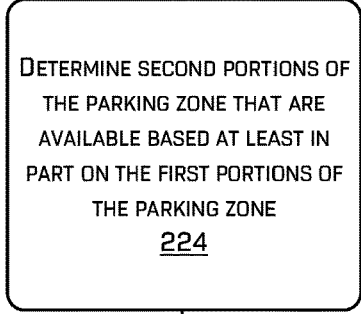
Figure 2B:
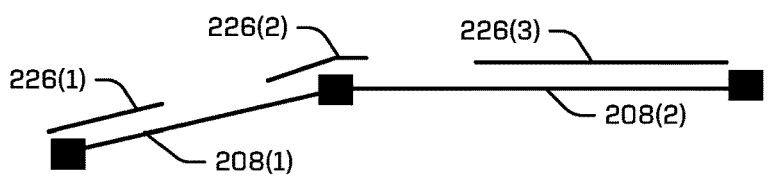
Figure 2B:
Figure 2C:
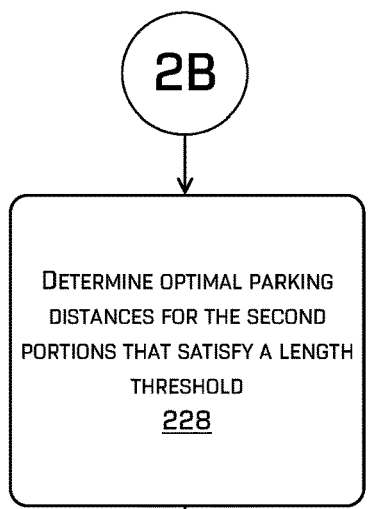
Figure 2C:
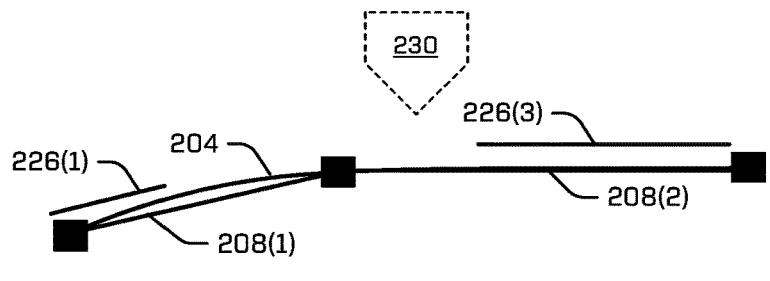
Figure 2C:
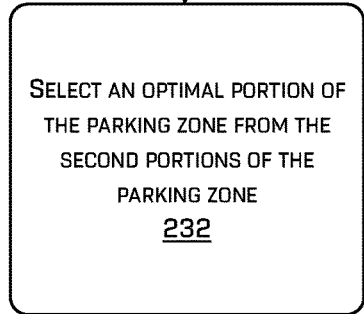
Figure 2C:
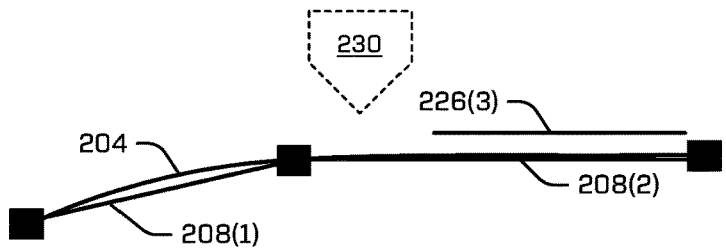

FIGS. 2A-2C depict an example process 200 for analyzing a parking zone in order to identify one or more portions of the parking zone that are available for parking a vehicle, in accordance with embodiments of the disclosure. At operation 202, the process 200 may include generating a line reference associated with a parking zone. For instance, the vehicle 102 may identify the parking zone, such as the parking zone 104. The vehicle 102 may then generate a line reference 204 that represents the parking zone. In some instances, the vehicle 102 generates the line reference 204 as an approximation of the parking zone. For instance, the line reference 204 may approximate the center of the parking zone.

At operation 206, the process 200 may include generating line segments approximating the line reference. For instance, the vehicle 102 may generate line segments 208 (1)-(2) (also referred to as "line segments 208") representing the line reference 204. In some instances, to generate the line segments 208, the vehicle 102 may sample along the line reference 204 in order to identify sample points 210(1)-(3) (also referred to as "sample points 210") that are located along the line reference 204. Although the example of FIGS. 2A-2C illustrates three sample points 210, in other examples, the vehicle 102 may identify any number of sample points 210 along the line reference 204. The sample points 210 may represent distances along the line reference 204. For example, the sample point 210(1) may include a first distance of zero, the sample point 210(2) may include a second distance that is longer than the first distance, and the sample point 210(3) may include a third distance that is greater than the second distance. The vehicle 102 may then generate the line segments 208 as connecting the sample points 210 along the line reference 204. Such number of points may be fixed, determined based on a length of the line reference 204, spaced equally or unequally along the line reference 204, and the like.

At operation 212, the process 200 may include generating polygons representing objects located proximate to the parking zone. For instance, the vehicle 102 may analyze sensor data in order to identify the objects located proximate to the parking zone. Additional details of analyzing the sensor data in order to identify the objects can be found in application Ser. No. 14/756,991, filed Nov. 4, 2015, and application Ser. No. 16/440,793, filed Oct. 30, 2017, both of which are incorporated herein by reference in their entirety. The vehicle 102 may also analyze the sensor data to identify points located on the objects (e.g., the shapes of the objects). Using the points, the vehicle 102 may dilate the objects in order to generate polygons 214(1)-(3) (also referred to as "polygons 214") representing the objects.

At operation 216, the process 200 may include determining intersections between the line segments and the polygons. For instance, the vehicle 102 may analyze the line segments 208 and the polygons 214, which is discussed in detail with regard to FIG. 3, in order to determine intersections 218(1)-(4) (also referred to as "intersections 218") between the line segments 208 and the polygons 214. As shown, the line segment 208(1) intersects with the polygon 214(1) at the intersections 218(1)-(2), the line segment 208(2) intersects with the polygon 214(2) at the intersections 218(3)-(4), and the line segments 208 do not intersect with the polygon 214(3). This may be because the objects represented by the polygons 214(1)-(2) are located at least partly within the parking zone while the object represented by the polygon 214(3) is not located within the parking zone.

The vehicle 102 may then determine the respective position along the line segments 208 of each of the intersections 218. Additionally, the vehicle 102 may covert the positions of the intersections 218 to distances along the line reference 204. In some instances, the vehicle 102 may determine the distances using the following formula:

$$a_{crossing} = a_{P0} \lambda (a_{P1} - a_{P0}) \quad (1)$$

In equation (1), $a_{crossing}$ is the distance to the intersection 218 along the line reference 204, $a_{P0}$ is the distance along the line reference 204 to the sample point 210 that is the beginning of the line segment 208 for which the intersection 218 is located, $a_{P0}$ is the distance along the line reference 204 to the sample point 210 that is the ending of the line segment 208 for which the intersection 218 is located, and $\lambda$ is the distance along the line segment 208 for which the intersection 218 is located.

At operation 220, the process 200 may include determining first portions of the parking zone that are unavailable based at least in part on the intersections. For instance, the vehicle 102 may determine first portions 222(1)-(2) (also referred to as "first portions 222") of the parking zone that are unavailable using the intersections 218. The first portions may be defined using a starting distance and an ending distance. In some instances, the starting distance may include the minimum crossing distance along the line reference 204 and the ending distance may include the maximum crossing distance along the line reference 204. For example, the first portion 222(1) may be defined as being between the distance along the line reference 204 associated with the intersection 218(1) and the distance along the line reference 204 associated with the intersection 218(2). Additionally, the first portion 222(2) may be defined as being between the distance along the line reference 204 associated with the intersection 218(3) and the distance along the line reference 204 associated with the intersection 218(4). In some instances, the vehicle 102 may save data indicating the first portions 222.

In some instances, although not illustrated in the example of FIGS. 2A-2C, if two or more second portions associated with two or more polygons intersect, the vehicle 102 may merge the two or more second portions into a single second portion. The single second portion may include a starting distance that is associated with the minimum crossing distance along the line reference for the two or more polygons and an ending distance that is associated with the maximum crossing distance along the line reference for the two or more polygons.

At operation 224, the process 200 may include determining second portions of the parking zone that are available based at least in part on the first portions of the parking zone. For instance, the vehicle 102 may determine second portions 226(1)-(3) (also referred to as "second portions 226") of the parking zone using the first portions 222 of the parking zone. In some instances, the vehicle 102 identifies the second portions 226 as the inverse to the first portions 222. In some instances, the vehicle 102 then determine whether the second portions 226 satisfy the length threshold and the width threshold. For instance, in the example of FIGS. 2A-2C, the vehicle 102 may determine that the second portion 226(2) is less than the length threshold and/or the width threshold.

At operation 228, the vehicle 102 may determine optimal parking distances for the second portions that satisfy a length threshold. For instance, the vehicle 102 may determine the optimal parking distances for the second portions 226 that satisfy the length threshold (e.g., the second portion 226(1) and the second portion 226(2)). In some instances, to determine the optimal parking distances, the vehicle 102 may determine a distance (denoted as $a_{goal}$) along the line reference 204 to a location 230 for which the vehicle 102 is navigating. The vehicle 102 may then determine sub-intervals for the second portions 226. In some instances, the vehicle 102 determines the sub-intervals using the following formulas:

$$(a_{start} + (d_{buffer} + \tfrac{1}{2} l_{vehicle}), a_{end} - (d_{buffer} + \tfrac{1}{2} l_{vehicle})) \quad (2)$$

In equation (2), $a_{start}$ is the distance along the line reference 204 to the start of the second portion 226, $a_{end}$ is the distance along the line reference 204 to the end of the second portion 226, $a_{vehicle}$ is the length of the vehicle 102, and $d_{buffer}$ is a distance buffer value. In some instances, the above equation is denoted as:

$$(a'_{start}, a'_{end}) \quad (3)$$

Additionally, the distances to the parking area (denoted as $a_{park}$) within the second portions 226 are selected according to the following logic:

$$\text{If: } a_{goal} < a'_{start}, a_{park} = a'_{start} \quad (4)$$

$$\text{If: } a_{goal} > a'_{start}, a_{park} = a'_{end} \quad (5)$$

$$\text{If: } a'_{start} < a_{goal} < a'_{start}, a_{park} = a_{goal} \quad (6)$$

At operation 232, the process 200 may include selecting an optimal portion of the parking zone from the second portions of the parking zone. For instance, the vehicle 102 may select the optimal portion (e.g., the second portion 226(3)) of the parking zone from among the second portions 226. In some instances, the vehicle 102 selects, for the optimal portion, the second portion 226(3) that is closest to the location 230. Additionally, or alternatively, in some instances, the vehicle 102 selects, for the optimal portion, the second portion 226(3) that includes the longest length. While these are just a couple of examples of selecting the optimal portion of the parking zone, in other examples, the vehicle 102 may use one or more additional and/or alternative techniques for selecting the optimal portion of the parking zone.

FIG. 3 illustrates an example of identifying intersections between a line segment 302 and a polygon 304 associated with an object, in accordance with embodiments of the disclosure. For instance, the vehicle 102 may identify the vertices 306(1)-(4) (also referred to as "vertices 306") of the polygon 304. The vehicle 102 then determines the z-component of the cross-product from the line segment 302 to each of the vertices 306. If the z-component of the cross-product is greater than zero, then the vertex 306 is on a first side 308 of the line segment 302. However, if the cross-product is less than zero, then the vertex 306 is on a second side 310 of the line segment 302 that is opposite to the first side 308.

For each pair of neighboring vertices 306, if the vertices 306 are on different sides of the line segment 302, then an edge 312(1)-(4) (also referred to as "edges 312") between the vertices 306 crosses the line segment 302. For instance, and in the example of FIG. 3, the edge 312(1) between the vertex 306(1) and the vertex 306(2) crosses the line segment 302 and the edge 312(3) between the vertex 306(3) and the vertex 306(4) crosses the line segment 302. The vehicle 102 then determines the positions of the crossings.

First, the vehicle 102 may determine where the two vertices 306 project onto the line segment 302. In some instances, the vehicle 102 may make the determinations using the following dot product formulas:

$$\lambda_{v_i} = l_0(v_i) \cdot \left( \frac{l_0(l_1)}{|l_0(l_1)|} \right) \quad (6)$$

$$\lambda_{v_j} = l_0(v_j) \cdot \left( \frac{l_0(l_1)}{|l_0(l_1)|} \right) \quad (7)$$

In equations (6) and (7), $\lambda_{v_i}$ is the distance along the line segment 302 to the vertex 306 $v_i$ and $\lambda_{v_j}$ is the distance to the vertex 306 $v_j$, both with respect to the initial position. In some examples, the function $I_0$, may indicate a vector from $I_0$ to a point. In some examples, $l_0$ is the distance to a starting sample point 314(1) of the line segment 302 from the start of the line reference and $l_1$ is the distance to an ending sample point 314(2) of the line segment 302 from the start of the line reference. The crossing position can then be found using the following formula:

$$\lambda = (d_i \lambda_{v_i} + d_j \lambda_{v_j})/(d_i + d_j) \quad (8)$$

In equation (8), $\lambda$ is the distance along the line segment 302 to the intersection, $d_i$ is the distance (e.g., distance 316(1)) from the line segment 302 to the vertex 306 $v_i$, and $d_j$ is the distance (e.g., distance 316(2)) from the line segment 302 to the vertex 306 $v_1$. In the example of FIG. 3, the vehicle 102 may perform these equations to determine the distance along the line segment 302 to an intersection 318(1) and the distance along the line segment 302 to an intersection 318(2).

Figure 4:
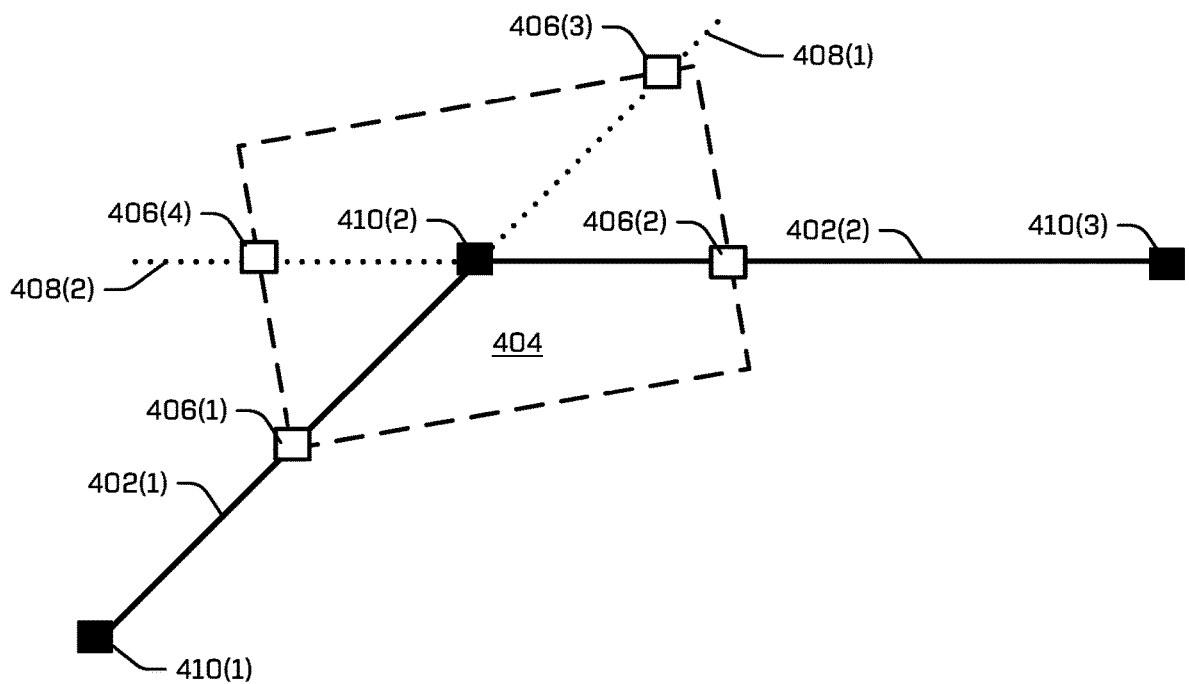
FIG. 4 illustrates an example of identifying intersections between multiple line segments and a polygon associated with an object, in accordance with embodiments of the disclosure.

FIG. 4 illustrates an example of identifying intersections between multiple line segments 402(1)-(2) (also referred to as "line segments 402") and a polygon 404 associated with an object, in accordance with embodiments of the disclosure. As shown, the polygon 404 intersects with the line segment 402(1) at an intersection 406(1) and intersects with the line segment 402(2) at an intersection 406(2). The polygon 404 also intersects with an extension 408(1) of the line segment 402(1) at intersection 406(3) and intersects with an extension 408(2) of the line segment 402(2) at intersection 406(4).

The vehicle 102 may determine the distances $\lambda$ along the line segments 402 and along the extensions 408(1)-(2) to the line segments 402 using the processes described with respect to FIG. 3. The vehicle 102 may then discard the intersection 406(3) that occurs with the extension 408(1) of the line segment 402(1) and the intersection 406(4) that occurs with the extension 408(2) of the line segment 402(2). In some instances, the vehicle 102 determines to discard the intersections 406(3)-(4) based on the distances $\lambda$.

For example, if the distance $\lambda$ to an intersection located on the line segment 402(1) and/or the extension 408(1) of the line segment 402(1) is not between the distance to a starting sample point 410(1) and the distance to an ending sample point 410(2) for the line segment 402(1), then the vehicle 102 may discard the intersection. For instance, and as illustrated in the example of FIG. 4, the intersection 406(1) is between the distance to the starting sample point 410(1) and the distance to the ending sample point 410(2) for the line segment 402(1), and the intersection 406(3) is not between the distance to the starting sample point 410(1) and the distance to the ending sample point 410(2) for the line segment 402(1). As such, the intersection 406(3) is discarded.

Additionally, if the distance $\lambda$ to an intersection located on the line segment 402(2) and/or the extension 408(2) of the line segment 402(2) is not between the distance to the starting sample point 410(2) and the distance to an ending sample point 410(3) for the line segment 402(2), then the vehicle 102 may discard the intersection. For instance, and as illustrated in the example of FIG. 4, the intersection 406(2) is between the distance to the starting sample point 410(2) and the distance to ending sample point 410(3) for the line segment 402(2), and the intersection 406(4) is not between the distance to the starting sample point 410(2) and the distance to the ending sample point 410(3) for the line segment 402(2). As such, the intersection 406(4) is discarded.

Figure 5:
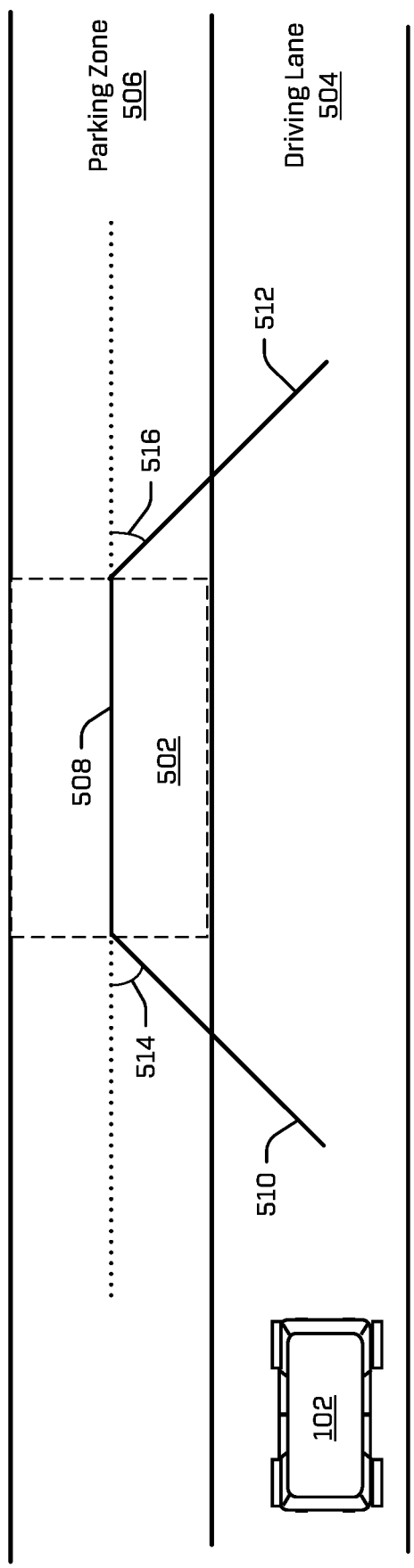
FIG. 5 illustrates an example of determining whether a parking zone is available using a safety buffer, in accordance with embodiments of the disclosure.

FIG. 5 illustrates an example of determining whether a parking region 502 is occupied using a safety buffer, in accordance with embodiments of the disclosure. As shown, while navigating along a driving lane 504, the vehicle 102 may identify the parking region 502 located within a parking zone 506. In some instances, the vehicle 102 identifies the parking region 502 using one or more of the processes described above (e.g., identifying an available portion of the parking zone 506). In some instances, the vehicle 102 identifies the parking region 502 based on the parking region 502 including one or more road signs and/or road markings indicating the parking region 502. Still, in some instances, the vehicle 102 identifies the parking region 502 using map data that is available to the vehicle 102.

The vehicle 102 may then generate a parking leg 508 for the parking region 502. In some instances, the parking leg 508 includes the center line of the parking region 502. In other instances, the parking leg 508 includes a different line of the parking region 502, which may be constructed using a final parked state for the vehicle 102. The vehicle 102 may also generate an entry leg 510 and an exit leg 512 for the parking region 502. The vehicle 102 may generate the entry leg 510 using a first angle 514 and generate the exit leg 512 using a second angle 516. In some instances, the first angle 514 is the same as the second angle 516. In other instances, the first angle 514 is different than the second angle 516. In either instance, an angle may include, but is not limited to, thirty degrees, forty-five degrees, sixty degrees, and/or any other angle.

In some instances, the first angle 514 and/or the second angle 516 are determined based on the dynamics of the vehicle 102. For example, the first angle 514 and/or the second angle 516 may be based on the maneuverability of the vehicle 102. The maneuverability of the vehicle 102 may be based on the length of the vehicle 102, the width of the vehicle 102, the maximum angle at which the vehicle 102 is able to turn, and/or the like. As such, the vehicle 102 may determine the first angle 514 and/or the second angle 516 for generating the parking leg 508, the entry leg 510, and/or the exit leg 512 such that the vehicle 102 is able to maneuver along the parking leg 508, the entry leg 510, and the exit leg 512 based on the maneuverability of the vehicle 102.

In some instances, the vehicle 102 may then perform one or more of the processes described herein to generate polygons associated with objects that are located proximate to the parking region 502. After generating the polygons, the vehicle 102 may determine whether the polygons intersect with the entry leg 510, the parking leg 508, and/or the exit leg 512. If the vehicle 102 determines that one or more polygons do not intersect, then the vehicle 102 may determine that the parking region 502 is not occupied. However, if the vehicle 102 determines that one or more polygons do intersect, then the vehicle 102 may determine that the parking region 502 is occupied.

Figure 6:
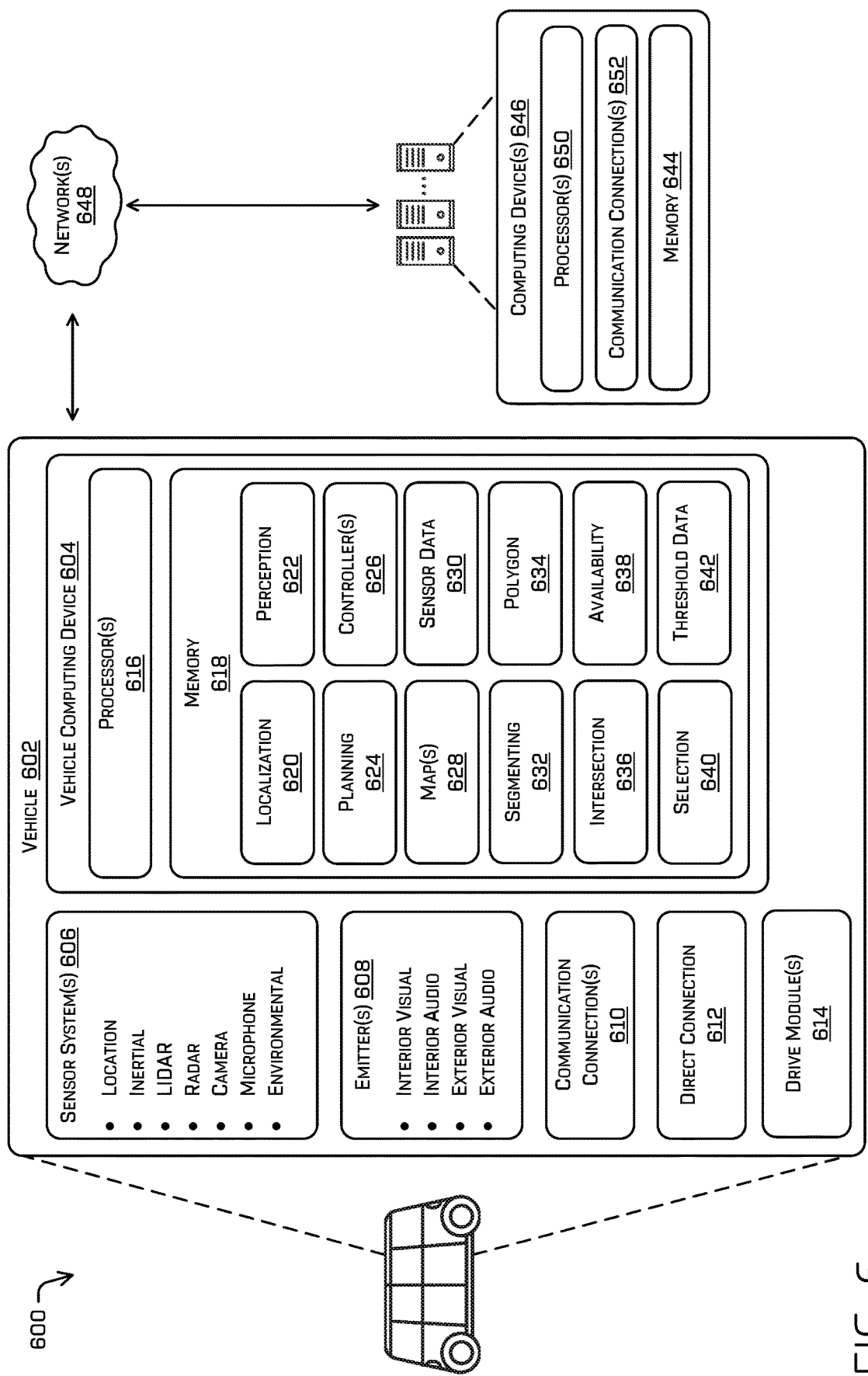
FIG. 6 is a block diagram of an example system for implementing the techniques described herein, in accordance with embodiments of the disclosure.

FIG. 6 is a block diagram of an example system 600 for implementing the techniques described herein. In at least one example, the system 600 may include a vehicle 602, such as the vehicle 102.

The vehicle 602 may include a vehicle computing device(s) 604, one or more sensor systems 606, emitter(s) 608, one or more communication connections 610, at least one direct connection 612, and one or more drive modules 614.

The vehicle computing device(s) 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera enabled smartphone). In the illustrated example, the memory 618 of the vehicle computing device(s) 604 stores a localization component 620, a perception component 622, a planning component 624, one or more system controllers 626, one or more maps 628, sensor data 430, a segmenting component 432, a polygon component 434, an intersection component 436, an availability component 438, a selection component 440, and threshold data 442. Though depicted in FIG. 6 as residing in the memory 618 for illustrative purposes, it is contemplated that the localization component 620, the perception component 622, the planning component 624, the system controller(s) 626, the map(s) 628, the sensor data 430, the segmenting component 432, the polygon component 434, the intersection component 436, the availability component 438, the selection component 440, and/or the threshold data 442 may additionally, or alternatively, be accessible to the vehicle 602 (e.g., stored on, or otherwise accessible by, memory remote from the vehicle 602, such as, for example, on memory 644 of computing device(s) 646.

In at least one example, the localization component 620 may include functionality to receive the sensor data 430 from the sensor system(s) 606 to determine a position and/or orientation of the vehicle 602 (e.g., one or more of an x-, y-, z-position, roll, pitch, or yaw). For example, the localization component 620 may include and/or request/receive a map of an environment and may continuously determine a location and/or orientation of the autonomous vehicle within the map. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 620 may provide data to various components of the vehicle 602 to determine an initial position of an autonomous vehicle for generating a path polygon associated with the vehicle path, as discussed herein.

In some instances, the perception component 622 may include functionality to perform object detection, segmentation, and/or classification. In some examples, the perception component 622 may provide processed sensor data 430 that indicates a presence of an agent (e.g., entity) that is proximate to the vehicle 602 and/or a classification of the agent as an agent type (e.g., car, pedestrian, cyclist, animal, building, tree, road surface, curb, sidewalk, unknown, etc.). In some examples, the perception component 622 may provide processed sensor data 430 that indicates a presence of a stationary entity that is proximate to the vehicle 602 and/or a classification of the stationary entity as a type (e.g., building, tree, road surface, curb, sidewalk, unknown, etc.).

In additional or alternative examples, the perception component 622 may provide processed sensor data 430 that indicates one or more characteristics associated with a detected agent (e.g., a tracked object) and/or the environment in which the agent is positioned. In some examples, characteristics associated with an agent may include, but are not limited to, an x-position (global and/or local position), a y-position (global and/or local position), a z-position (global and/or local position), an orientation (e.g., a roll, pitch, yaw), an agent type (e.g., a classification), a velocity of the agent, an acceleration of the agent, an extent of the agent (size), etc. Characteristics associated with the environment may include, but are not limited to, a presence of another agent in the environment, a state of another agent in the environment, a time of day, a day of a week, a season, a weather condition, an indication of darkness/light, etc.

In general, the planning component 624 may determine a path for the vehicle 602 to follow to traverse through an environment. For example, the planning component 624 may determine various routes and trajectories and various levels of detail. For example, the planning component 624 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 624 may generate an instruction for guiding the autonomous vehicle along at least a portion of the route from the first location to the second location. In at least one example, the planning component 624 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 602 to navigate.

In at least one example, the vehicle computing device(s) 604 may include the system controller(s) 626, which may be configured to control steering, propulsion, braking, safety, emitters, communication, and other systems of the vehicle 602. The system controller(s) 626 may communicate with and/or control corresponding systems of the drive module(s) 614 and/or other components of the vehicle 602.

The memory 618 may further include the map(s) 628 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 628. That is, the map(s) 628 may be used in connection with the localization component 620, the perception component 622, and/or the planning component 624 to determine a location of the vehicle 602, detect objects in an environment, detecting parking zones within an environment, and/or generate routes and/or trajectories to navigate within an environment.

In some examples, the map(s) 628 may be stored on a remote computing device(s) (such as the computing device(s) 446) accessible via network(s) 448. In some examples, multiple maps 628 may be stored based on, for example, a characteristic (e.g., type of entity, time of day, day of week, season of the year, etc.). Storing multiple maps 628 may have similar memory requirements, but increase the speed at which data in a map may be accessed.

The segmenting component 632 may perform one or more of the processes described herein in order to segment a parking zone. For instance, the segmenting component 632 may generate the line reference for a parking zone. Additionally, the segmenting component 632 may determine a number of sampling points located on the line reference and generate the line segments using the sampling points. In some instances, the segmenting component 632 determines a set number of sampling points on the line reference, such as two sampling points, five sampling points, ten sampling points, and/or the like. In some instances, the segmenting component 632 determines the number of sampling points based on a length of the parking zone. For instance, the segmenting component 632 may determine a first number of sampling points for a first parking zone that includes a first length and a second, greater number of sampling points for a second parking zone that includes a second, greater length. Such points may be distributed uniformly, randomly, linearly, or according to any other distribution. In at least some examples, such points may be spaced based at least in part on a curvature of the associated line reference (e.g., proportional to the curvature).

The polygon component 634 may perform one or more of the processes described herein in order to generate polygons representing objects. For instance, the polygon component 634 may receive data from the perception component 622 that indicates location of objects and/or shapes of the objects. The polygon component 634 may then generate the polygons by dilating the shapes. In some instances, the perception component 622 dilates the objects based on a width of the vehicle 602.

The intersection component 636 may perform one or more of the processes described herein in order to determine intersection between the line segments and the polygons. For instance, the intersection component 636 may determine which of the polygons the line segments intersect. The intersection component 636 may then determine the locations of the intersections along the line segments and and/or the line reference.

The availability component 638 may perform one or more of the processes described herein in order to identify portions of the parking zone that are unavailable and portions of the parking zone that are available. For instance, the availability component 638 may use the locations of the intersection in order to identify the portions of the parking zone that are unavailable. Using the portion of the parking zone that are unavailable, the availability component 638 may identify the portions of the parking zone that are available.

The selection component 640 may perform one or more of the processes described herein to select a portion of a parking zone. For instance, the selection component 640 may identify portions of the parking zone that are adequate for the vehicle 602. In some instances, the selection component 640 identifies a portion based on a length of the portion satisfying a threshold length and/or a width of the portion satisfying a threshold width, where the threshold length and/or the threshold width are represented by the threshold data 642. If the selection component 640 identifies more than one portion, then the selection component 640 may use one or more factors associated with the portions to select one of the portions. For a first example, the selection component 640 may select the portion that is closest to the destination location for the vehicle 602. For a second example, the selection component 640 may select the portion that includes the longest length.

As can be understood, the components discussed herein (e.g., the localization component 620, the perception component 622, the planning component 624, the system controller(s) 626, the one or more maps 628, the sensor data 530, the segmenting component 632, the polygon component 634, the intersection component 636, the availability component 638, the selection component 640, and/or the threshold data 643 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 618 (and the memory 644, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 606 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the LIDAR sensors may include individual LIDAR sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device(s) 604. Additionally or alternatively, the sensor system(s) 606 may send sensor data 630, via the one or more networks 648, to the computing device(s) 646 at a particular frequency, after a lapse of a predetermined period of time, in near real-time, etc.

The vehicle 602 may also include emitter(s) 608 for emitting light and/or sound, as described above. The emitter(s) 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connection(s) 610 that enable communication between the vehicle 602 and one or more other local or remote computing device(s). For instance, the communication connection(s) 610 may facilitate communication with other local computing device(s) on the vehicle 602 and/or the drive module(s) 614. Also, the communication connection(s) 610 may allow the vehicle to communicate with other nearby computing device(s) and/or the computing device(s) 646 for receiving sensor data.

The communications connection(s) 610 may include physical and/or logical interfaces for connecting the vehicle computing device(s) 604 to another computing device or a network, such as network(s) 648. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 6G, etc.) or any suitable wired or wireless communications protocol that enables the respective computing device to interface with the other computing device(s).

In at least one example, the vehicle 602 may include drive module(s) 614. In some examples, the vehicle 602 may have a single drive module 614. In at least one example, if the vehicle 602 has multiple drive modules 614, individual drive modules 614 may be positioned on opposite ends of the vehicle 602 (e.g., the front and the rear, etc.). In at least one example, the drive module(s) 614 may include one or more sensor systems to detect conditions of the drive module(s) 614 and/or the surroundings of the vehicle 602. By way of example and not limitation, the sensor system(s) 606 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 614. In some cases, the sensor system(s) on the drive module(s) 614 may overlap or supplement corresponding systems of the vehicle 602 (e.g., sensor system(s) 606).

The drive module(s) 614 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 614. Furthermore, the drive module(s) 614 may also include one or more communication connection(s) that enable communication by the respective drive module with one or more other local or remote computing device(s).

In at least one example, the direct connection 612 may provide a physical interface to couple the one or more drive module(s) 614 with the body of the vehicle 602. For example, the direct connection 612 may allow the transfer of energy, fluids, air, data, etc. between the drive module(s) 614 and the vehicle. In some instances, the direct connection 612 may further releasably secure the drive module(s) 614 to the body of the vehicle 602.

In at least one example, the localization component 620, the perception component 622, the planning component 624, the system controller(s) 626, the map(s) 628, the segmenting component 632, the polygon component 634, the intersection component 636, the availability component 638, the selection component 640 and various components thereof, may process the sensor data 630, as described above, and may send their respective outputs, over the one or more network(s) 648, to the computing device(s) 646. In at least one example, the localization component 620, the perception component 622, the planning component 624, the system controller(s) 626, the map(s) 628, the segmenting component 632, the polygon component 634, the intersection component 636, and the availability component 638, the selection component 640 may send their respective outputs to the computing device(s) 646 at a particular frequency, after a lapse of a predetermined period of time, in near real-time, etc.

In some examples, the vehicle 602 may send the sensor data 630 to the computing device(s) 646 via the network(s) 648. In some examples, the vehicle 602 may receive sensor data 630 from the computing device(s) 646 via the network(s) 648. The sensor data 630 may include raw sensor data and/or processed sensor data 630 and/or representations of sensor data 630. In some examples, the sensor data 630 (raw or processed) may be sent and/or received as one or more log files.

The computing device(s) 646 may include processor(s) 650, communication connection(s) 652, and the memory 644. In some instances, the computing device(s) 646 may be configured to perform one or more of the processes described herein with respect to the vehicle 602. In such instances, the computing device(s) 646 may send, to the vehicle 602, data representing results of the processing.

The processor(s) 616 of the vehicle 602 and the processor(s) 650 of the computing device(s) 646 may be any suitable processor capable of executing instructions to process data and perform operations as described herein. By way of example and not limitation, the processor(s) 616 and 650 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and 644 are examples of non-transitory computer-readable media. The memory 618 and 644 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 618 and 644 may include at least a working memory and a storage memory. For example, the working memory may be a high-speed memory of limited capacity (e.g., cache memory) that is used for storing data to be operated on by the processor(s) 616 and 650. In some instances, the memory 618 and 644 may include a storage memory that may be a lower-speed memory of relatively large capacity that is used for long-term storage of data. In some cases, the processor(s) 616 and 650 cannot operate directly on data that is stored in the storage memory, and data may need to be loaded into a working memory for performing operations based on the data, as discussed herein.

It should be noted that while FIG. 6 is illustrated as a distributed system, in alternative examples, components of the vehicle 602 may be associated with the computing device(s) 646 and/or components of the computing device(s) 646 may be associated with the vehicle 602. That is, the vehicle 602 may perform one or more of the functions associated with the computing device(s) 646, and vice versa.

Figure 7:
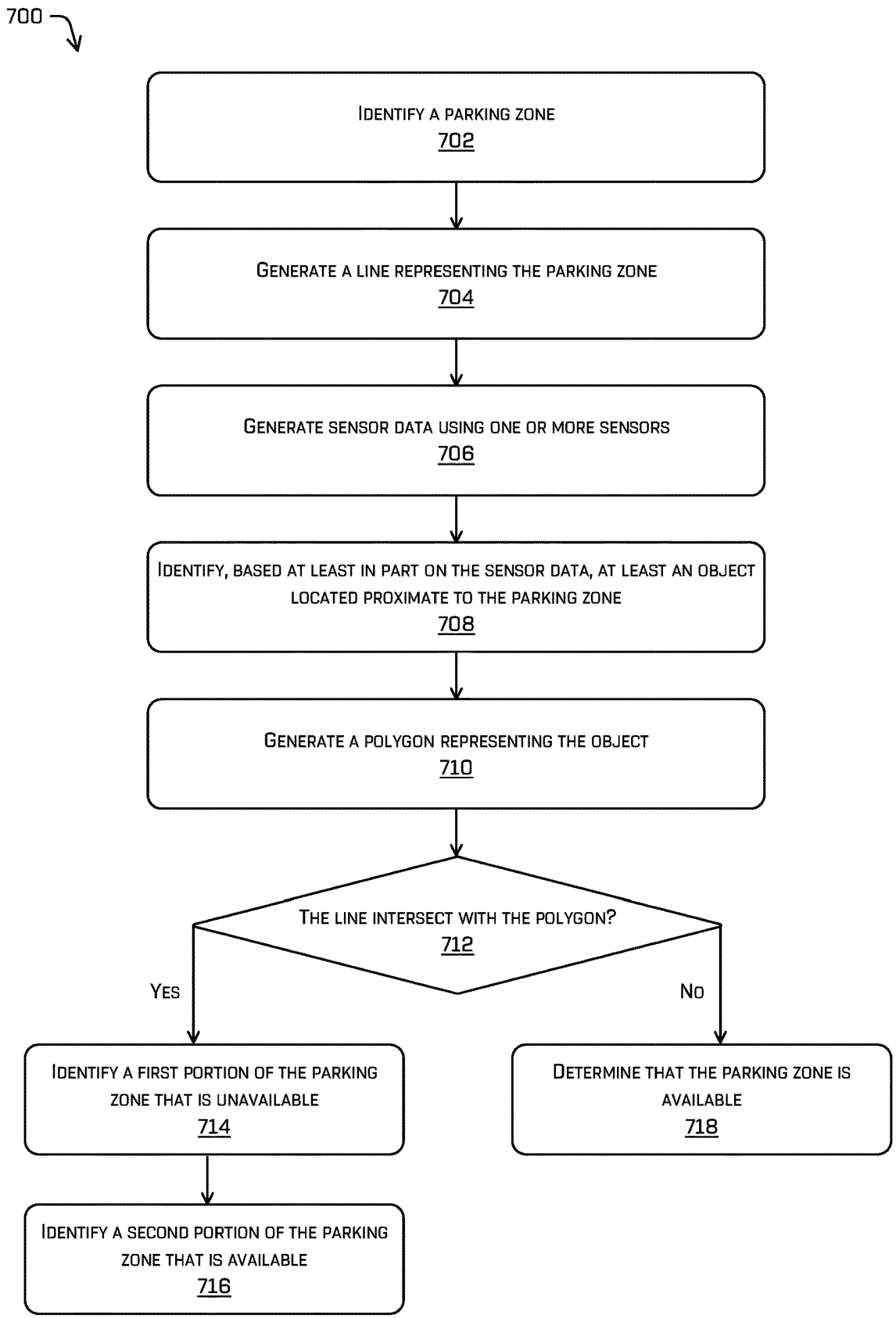
FIG. 7 depicts an example process for identifying available portions of a parking zone, in accordance with embodiments of the disclosure.

FIG. 7 depicts an example process 700 for identifying available portions of a parking zone, in accordance with embodiments of the disclosure. At operation 702, the process 700 may include identifying a parking zone. For instance, the vehicle 602 may identify the parking zone located near a location for which the vehicle 602 is navigating. In some instances, the vehicle 602 identifies the parking zone using map data that is available to the vehicle 602. In some instances, the vehicle 602 identifies the parking zone using sensor data generated by one or more sensors of the vehicle 602.

At operation 704, the process 700 may include generating a line representing the parking zone. For instance, the vehicle 602 may generate the line that represents the parking zone. In some instances, the line may include a line reference representing the parking zone. Additionally, or alternatively, in some instances, the line may include one or more line segments representing the line reference and/or the parking zone.

At operation 706, the process 700 may include generating sensor data using one or more sensors and at operation 708, the process 700 may include identifying, based at least in part on the sensor data, at least an object located proximate to the parking zone. For instance, the vehicle 602 may generate the sensor data using one or more sensors of the vehicle 602. The vehicle 602 may then analyze the sensor data in order to identify the object located proximate to the parking zone. In some instances, the object may be located proximate to the parking zone when at least a portion of the object is located within the parking zone. Additionally, or alternatively, in some instances, the object may be located proximate to the parking zone when the object is located within a threshold distance to the parking zone.

At operation 710, the process 700 may include generating a polygon representing the object. For instance, the vehicle 602 may generate the polygon representing the object. In some instances, to generate the polygon, the vehicle 602 may analyze the sensor data to identify one or more points located on an outer portion of the object. The vehicle 602 may then dilate the one or more points in order to generate the polygon. In some instances, the vehicle 602 dilates the polygon based at least in part on a width of the vehicle 602.

At operation 712, the process 700 may include determining whether the line intersects with the polygon. For instance, the vehicle 602 may analyze the line and the polygon to determine whether the line intersects with the polygon. If the vehicle 602 determines that the line intersects with the polygon, then the vehicle 602 may determine that the object is located at least partly within the parking zone. Additionally, the vehicle 602 may identify at least two intersecting points located along the line. However, if the vehicle 602 determines that the line does not intersect with the polygon, then the vehicle 602 may determine that the object is not located within the parking zone.

If at operation 712 it is determined that the line intersects with the polygon, then at operation 714, the process 700 may include identifying a first portion of the parking zone that is unavailable. For instance, if the vehicle 602 determines that the line intersects with the polygon, then the vehicle 602 may use the intersections to identify the first portion of the parking zone that is unavailable. In some instances, the vehicle 602 identifies the first portion by determining locations within the parking zone that are associated with the intersections. The vehicle 602 may then determine the first portion as the area of the parking zone that is between the locations.

Additionally, at operation 716, the process 700 may include identifying a second portion of the parking zone that is available. For instance, after identifying the first portion of the parking zone, the vehicle 602 may use the first portion of the parking zone to identify the second portion of the parking zone that is available. In some instance, the second portion of the parking zone includes the portion of the parking zone that is outside of the first portion of the parking zone.

However, if at operation 712 it is determined that the line does not intersect with the polygon, then at operation 718, the process 700 may include determining that the parking zone is available. For instance, if the vehicle 602 determines that the line does not intersect with the polygon, then the vehicle 602 may determine that the parking zone is available.

Figure 8:
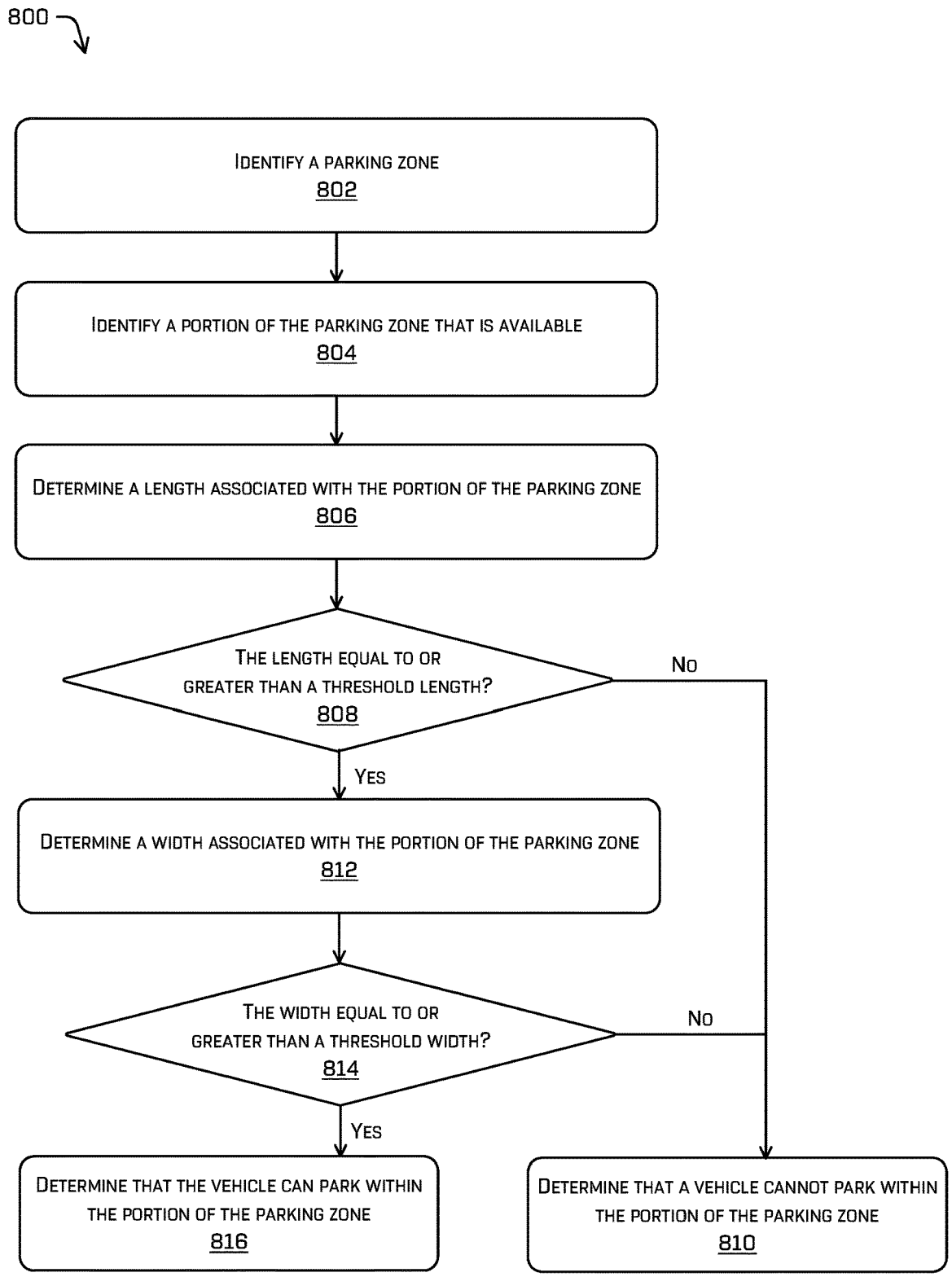
FIG. 8 depicts an example process for determining that a portion of a parking zone is adequate for a vehicle, in accordance with embodiments of the disclosure.

FIG. 8 depicts an example process 800 for determining that a portion of a parking zone is adequate for a vehicle, in accordance with embodiments of the disclosure. At operation 802, the process 800 may include identifying a parking zone. For instance, the vehicle 602 may identify the parking zone located near a location for which the vehicle 602 is navigating. In some instances, the vehicle 602 identifies the parking zone using map data that is available to the vehicle 602. In some instances, the vehicle 602 identifies the parking zone using sensor data generated by one or more sensors of the vehicle 602.

At operation 804, the process 800 may include identifying a portion of the parking zone that is available. For instance, the vehicle 602 may identify the portion of the parking zone that is available. In some instances, the vehicle 602 identifies the portion of the parking zone using the example process 700 of FIG. 7.

At operation 806, the process 800 may include determining a length associated with the portion of the parking zone and at 808, the process 800 may include determining whether the length is equal to or greater than a threshold length. For instance, the vehicle 602 may determine the length of the portion of the parking zone. In some instances, the vehicle 602 determines the length using the locations of the intersections that were used to identify the portion of the parking zone. The vehicle 602 may then determine whether the length is equal to or greater than the threshold length. In some instances, the threshold length is equal to the length of the vehicle plus a buffer length.

If at operation 808 it is determined that the length is not equal to or greater than the threshold length, then at operation 810, the process 800 may include determining that a vehicle cannot park within the portion of the parking zone. For instance, if the vehicle 602 determines that the length is less than the threshold length, then the vehicle 602 may determine that the portion of the parking zone is not adequate for the vehicle 602 to park. As such, the vehicle 602 may analyze the parking zone for an additional portion that is available for the vehicle 602.

However, if at 808 it is determined that the length is equal to or greater than the threshold length, then at operation 812, the process 800 may include determining a width associated with the portion of the parking zone and at operation 814, the process 800 may include determining whether the width is equal to or greater than a threshold width. For instance, the vehicle 602 may determine the width of the portion of the parking zone. In some instances, the vehicle 602 determines the width using map data that is available to the vehicle 602 and/or sensor data generated by one or more sensors of the vehicle 602. The vehicle 602 may then determine if the width is equal to or greater than the threshold width.

If at operation 814 it is determined that the width is not equal to or greater than the threshold width, then at operation 810, the process 800 may include determining that the vehicle cannot park within the parking zone. For instance, if the vehicle 602 determines that the width is less than the threshold width, then the vehicle 602 may again determine that the portion of the parking zone is not adequate for the vehicle 602 to park. As such, the vehicle 602 may analyze the parking zone for an additional portion that is available for the vehicle 602.

However, if at operation 814 it is determined that the width is equal to or greater than the threshold width, then at operation 816, the process 800 may include determining that the vehicle can park within the portion of the parking zone. For instance, if the vehicle 602 determines that the width is equal to or greater than the threshold width, the vehicle 602 may determine to park within the portion of the parking zone. As such, the vehicle 602 may navigate to and then park within the portion of the parking zone.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A: An autonomous vehicle comprising: a sensor; one or more processors; and one or more computer-readable media storing instructions that, when executed by the one or more processors, cause the autonomous vehicle to perform operations comprising: determining, based at least in part on map data available to the autonomous vehicle, a parking zone; generating a line segment representing the parking zone;

receiving sensor data using the sensors; identifying an object based at least in part on the sensor data; generating a polygon representing the object; determining a first intersection between a first point on the line segment and the polygon; determining a second intersection between a second point on the line segment and the polygon; determining, based at least in part on the first intersection and the second intersection, that a first portion of the parking zone that is unavailable; determining, based at least in part on the first portion of the parking zone, that a second portion of the parking zone that is available; and causing the autonomous vehicle to park within the second portion of the parking zone.

B: The autonomous vehicle as recited in paragraph A, wherein determining the first intersection between the first point on the line segment and the polygon comprises: determining a plurality of points along the line segment; determining a plurality of vertices associated with the polygon; determining, for a pair of adjacent vertices of the plurality of vertices, that a first vertex of the pair lies on an opposite side of the line segment than a second vertex of the pair; and determining, as the first intersection and based at least in part on the pair of adjacent vertices, a distance along the line segment.

C: The autonomous vehicle as recited in either of paragraphs A or B, the operations further comprising: determining that a third portion of the parking zone is available; determining one or more first factors associated with the second portion of the parking zone; and determining one or more second factors associated with the third portion of the parking zone, wherein causing the autonomous vehicle to park within the second portion of the parking zone is based at least in part on the one or more first factors and the one or more second factors.

D: The autonomous vehicle as recited in any of paragraphs A-C, the operations further comprising: generating a line reference that approximates the parking zone; determining a first sample point along the line reference; and determining a second sample point along the line reference, wherein generating the line reference representing the parking zone is based at least in part on the first sample point and the second sample point.

E: The autonomous vehicle as recited in any of paragraphs A-D, the operations further comprising: determining a length associated with the second portion of the parking zone; and determining that the length is equal to or greater than a threshold length, wherein causing the autonomous vehicle to park within the second portion of the parking zone is based at least in part on the length being equal to or greater than the threshold length.

F: A method comprising: identifying a parking zone for a vehicle; generating a line representing the parking zone; receiving sensor data from a sensor of the vehicle; identifying, based at least in part on the sensor data, an object; determining a first location associated with the object intersecting with the line; determining a second location associated with the object intersecting with the line; determining, based at least in part on the first location and the second location, that a first portion of the parking zone is unavailable; and determining, based at least in part on the first portion of the parking zone, that a second portion of the parking zone is available.

G: The method as recited in paragraph F, further comprising causing the vehicle to park within the second portion of the parking zone based at least in part on determining that the second portion of the parking zone is available.

H: The method as recited in either of paragraphs F or G, further comprising: generating a polygon representing the object, wherein: determining the first location associated with the object intersecting with the line comprises determining a first intersection between the line and the polygon, the first intersection corresponding to the first location; and determining the second location associated with the object intersecting with the line comprises determining a second intersection between the line and the polygon, the second intersection corresponding to the second location.

I: The method as recited in any of paragraphs F-H, wherein generating the polygon representing the object comprises at least: determining, based at least in part on the sensor data, a shape associated with the object; and generating the polygon by increasing at least one of a width or a length of the shape of the object based at least in part on at least one of a width or a length of the vehicle.

J: The method as recited in any of paragraphs F-I, wherein determining the first intersection between the line and the polygon comprises at least: determining that a first vertex associated with the polygon is located on a first side of the line; determining that a second vertex associated with the polygon is located on a second side of the line that is opposite the first side of the line; and based at least in part on the first vertex being located in the first side of the line and the second vertex being location in the second side of the line, determining that an edge between the first vertex and the second vertex of the polygon intersects with the line at the first intersection.

K: The method as recited in any of paragraphs F-J, further comprising: identifying, based at least in part on the sensor data, an additional object; determining a third location associated with the additional object intersecting with the line; determining a fourth location associated with the additional object intersecting with the line; and determining, based at least in part on the third location and the fourth location, that a third portion of the parking zone is unavailable, wherein determining that the second portion of the parking zone that is available is further based at least in part on the third portion of the parking zone.

L: The method as recited in any of paragraphs F-K, further comprising: determining, based at least in part on the first portion of the parking zone, that a third portion of the parking zone is available; determining one or more first factors associated with the second portion of the parking zone; determining one or more second factors associated with the third portion of the parking zone; and selecting the second portion of the parking zone based at least in part on the one or more first factors and the one or more second factors.

M: The method as recited in any of paragraphs F-L, wherein: the one or more first factors comprise at least one of: a first length associated with the second portion of the parking zone; a first width associated with the second portion of the parking zone; a first maneuverability of the vehicle associated with parking in the second portion of the parking zone; a first distance between the second portion of the parking zone and a destination location for the vehicle; or a first speed limit associated with the second portion of the parking zone; and the one or more second factors comprise at least one of: a second length associated with the third portion of the parking zone; a second width associated with the third portion of the parking zone; a second maneuverability of the vehicle associated with parking in the third portion of the parking zone; a second distance between the third portion of the parking zone and the destination location for the vehicle; or a second speed limit associated with the third portion of the parking zone.

N: The method as recited in any of paragraphs F-M, further comprising: determining a length associated with the second portion of the parking zone; and determining that the length is equal to or greater than a threshold length, wherein causing the vehicle to park within the second portion of the parking zone is based at least in part on the length being equal to or greater than the threshold length.

O: The method as recited in any of paragraphs F-N, further comprising: receiving destination data representing a destination location associated with the vehicle; and identifying the parking zone based at least in part on the destination location and map data available to the vehicle.

P: One or more non-transitory computer-readable media storing instructions that, when executed by one or more processors, cause one or more computing devices to perform operations comprising: identifying a drive area; generating a line associated with the drive area; receiving sensor data from a sensor of a vehicle; identifying, based at least in part on the sensor data, an object; determining that at least a first portion of the drive area is unavailable for parking the vehicle based at least in part on a representation of the object intersecting with the line; and determining that at least a second portion of the drive area is available for parking the vehicle based at least in part on the first portion of the drive area.

Q: The one or more non-transitory computer-readable media as recited in paragraph P, wherein determining that the at least the first portion of the drive area is unavailable comprises at least: generating the representation of the object; determining a first intersection between the line and the representation; determining a second intersection between the line and the representation; and determining that the at least the first portion of the drive area corresponds to the line between the first intersection and the second intersection.

R: The one or more non-transitory computer-readable media as recited in either of paragraphs P or Q, wherein determining the first intersection between the line and the polygon comprises at least: determining that a first vertex associated with the representation is located on a first side of the line; determining that a second vertex associated with the representation is located on a second side of the line that is opposite the first side of the line; and based at least in part on the first vertex being located in the first side of the line and the second vertex being location in the second side of the line, determining that an edge between the first vertex and the second vertex of the representation intersects with the line at the first intersection.

S: The one or more non-transitory computer-readable media as recited in any of paragraphs P-R, the operations further comprising: determining, based at least in part on the first portion of the parking area, that a third portion of the drive area is available; determining one or more first factors associated with the second portion of the drive area; determining one or more second factors associated with the third portion of the drive area; and selecting the second portion of the drive area based at least in part on the one or more first factors and the one or more second factors.

T: The one or more non-transitory computer-readable media as recited in any of paragraphs P-S, wherein: the one or more first factors comprise at least one of: a first length associated with the second portion of the drive area; a first width associated with the second portion of the drive area; a first maneuverability of the vehicle associated with parking in the second portion of the drive area; a first distance between the second portion of the drive area and a destination location for the vehicle; or a first speed limit associated with the second portion of the drive area; and the one or more second factors comprise at least one of: a second length associated with the third portion of the drive area; a second width associated with the third portion of the drive area; a second maneuverability of the vehicle associated with parking in the third portion of the drive area; a second distance between the third portion of the drive area and the destination location for the vehicle; or a second speed limit associated with the third portion of the drive area.

What is claimed is:

1. One or more non-transitory computer-readable media storing instructions that, when executed by one or more processors, cause one or more computing devices to perform operations comprising:
   identifying a drive area;
   generating a line associated with the drive area, the line providing a reference for a vehicle to follow to park in a parking space;
   receiving sensor data from a sensor of the vehicle;
   identifying, based at least in part on the sensor data, an object;
   determining that at least a first portion of the drive area is unavailable for parking the vehicle based at least in part on a representation of the object intersecting with the line;
   determining that at least a second portion of the drive area is available for parking the vehicle based at least in part on the first portion of the drive area; and
   causing the vehicle to take an action based at least in part on determining that the second portion of the drive area is available.

2. The one or more non-transitory computer-readable media as recited in claim 1, wherein determining that the at least the first portion of the drive area is unavailable comprises at least:
   generating the representation of the object;
   determining a first intersection between the line and the representation;
   determining a second intersection between the line and the representation; and
   determining that the at least the first portion of the drive area corresponds to the line between the first intersection and the second intersection.

3. The one or more non-transitory computer-readable media as recited in claim 2, wherein determining the first intersection between the line and the representation comprises at least:
   determining that a first vertex associated with the representation is located on a first side of the line;
   determining that a second vertex associated with the representation is located on a second side of the line that is opposite the first side of the line; and
   based at least in part on the first vertex being located in the first side of the line and the second vertex being located in the second side of the line, determining that an edge between the first vertex and the second vertex associated with the representation intersects with the line at the first intersection.

4. The one or more non-transitory computer-readable media as recited in claim 1, the operations further comprising:
   determining, based at least in part on the first portion of the drive area, that a third portion of the drive area is available;

determining one or more first factors associated with the second portion of the drive area;

determining one or more second factors associated with the third portion of the drive area; and selecting the second portion of the drive area based at least in part on the one or more first factors and the one or more second factors.

5. The one or more non-transitory computer-readable media as recited in claim 4, wherein:

the one or more first factors comprise at least one of:
- a first length associated with the second portion of the drive area;
- a first width associated with the second portion of the drive area;
- a first maneuverability of the vehicle associated with parking in the second portion of the drive area;
- a first distance between the second portion of the drive area and a destination location for the vehicle; or
- a first speed limit associated with the second portion of the drive area; and the one or more second factors comprise at least one of:
- a second length associated with the third portion of the drive area;
- a second width associated with the third portion of the drive area;
- a second maneuverability of the vehicle associated with parking in the third portion of the drive area;
- a second distance between the third portion of the drive area and the destination location for the vehicle; or
- a second speed limit associated with the third portion of the drive area.

6. An autonomous vehicle comprising:

a sensor;

one or more processors; and one or more computer-readable media storing instructions that, when executed by the one or more processors, cause the autonomous vehicle to perform operations comprising:
- identifying a drive area;
- generating a line associated with the drive area, the line providing a reference for the autonomous vehicle to follow to park in a parking space;
- receiving sensor data from the sensor;
- identifying, based at least in part on the sensor data, an object;
- determining that at least a first portion of the drive area is unavailable for parking the autonomous vehicle based at least in part on a representation of the object intersecting with the line;
- determining that at least a second portion of the drive area is available for parking the autonomous vehicle based at least in part on the first portion of the drive area; and
- causing the autonomous vehicle to take an action based at least in part on determining that the second portion of the drive area is available.

7. The autonomous vehicle as recited in claim 6, wherein determining that the at least the first portion of the drive area is unavailable comprises at least:
- generating the representation of the object;
- determining a first intersection between the line and the representation;
- determining a second intersection between the line and the representation; and
- determining that the at least the first portion of the drive area corresponds to the line between the first intersection and the second intersection.

8. The autonomous vehicle as recited in claim 7, wherein determining the first intersection between the line and the representation comprises at least:
- determining that a first vertex associated with the representation is located on a first side of the line;
- determining that a second vertex associated with the representation is located on a second side of the line that is opposite the first side of the line; and
- based at least in part on the first vertex being located in the first side of the line and the second vertex being located in the second side of the line, determining that an edge between the first vertex and the second vertex associated with the representation intersects with the line at the first intersection.

9. The autonomous vehicle as recited in claim 6, the operations further comprising:
- determining, based at least in part on the first portion of the drive area, that a third portion of the drive area is available;
- determining one or more first factors associated with the second portion of the drive area;
- determining one or more second factors associated with the third portion of the drive area; and
- selecting the second portion of the drive area based at least in part on the one or more first factors and the one or more second factors.

10. The autonomous vehicle as recited in claim 9, wherein:

the one or more first factors comprise at least one of:
- a first length associated with the second portion of the drive area;
- a first width associated with the second portion of the drive area;
- a first maneuverability of the autonomous vehicle associated with parking in the second portion of the drive area;
- a first distance between the second portion of the drive area and a destination location for the autonomous vehicle; or
- a first speed limit associated with the second portion of the drive area; and the one or more second factors comprise at least one of:
- a second length associated with the third portion of the drive area;
- a second width associated with the third portion of the drive area;
- a second maneuverability of the autonomous vehicle associated with parking in the third portion of the drive area;
- a second distance between the third portion of the drive area and the destination location for the autonomous vehicle; or
- a second speed limit associated with the third portion of the drive area.

11. The autonomous vehicle as recited in claim 6, wherein causing the autonomous vehicle to take the action comprises causing the autonomous vehicle to park within the second portion of the drive area.

12. The autonomous vehicle as recited in claim 6, further comprising:
- determining that a third portion of the drive area is available;
- determining one or more first factors associated with the second portion of the drive area; and
- determining one or more second factors associated with the third portion of the drive area, wherein causing the autonomous vehicle to take the action is further based at least in part on the one or more first factors and the one or more second factors.

13. The autonomous vehicle as recited in claim 6, the operations further comprising:
generating a line reference that represents the drive area;
determining a first sample point along the line reference; and
determining a second sample point along the line reference;
wherein generating the line reference representing the drive area is based at least in part on the first sample point and the second sample point.

14. The autonomous vehicle as recited in claim 6, further comprising:
determining a length associated with the second portion of the drive area; and
determining that the length is equal to or greater than a threshold length,
wherein causing the autonomous vehicle to take the action is further based at least in part on the length being equal to or greater than the threshold length.

15. The autonomous vehicle as recited in claim 6, further comprising:
receiving destination data representing a destination location associated with the autonomous vehicle; and
identifying the drive area based at least in part on the destination location and map data available to the autonomous vehicle.

16. A method comprising:
identifying a drive area;
generating a line associated with the drive area, the line providing a reference for a vehicle to follow to park in a parking space;
receiving sensor data from a sensor of the vehicle;
identifying, based at least in part on the sensor data, an object;
determining that at least a first portion of the drive area is unavailable for parking the vehicle based at least in part on a representation of the object intersecting with the line;
determining that at least a second portion of the drive area is available for parking the vehicle based at least in part on the first portion of the drive area; and
causing the vehicle to take an action based at least in part on determining that the second portion of the drive area is available.

17. The method as recited in claim 16, wherein determining that the at least the first portion of the drive area is unavailable comprises at least:
generating the representation of the object;
determining a first intersection between the line and the representation;
determining a second intersection between the line and the representation; and
determining that the at least the first portion of the drive area corresponds to the line between the first intersection and the second intersection.

18. The method as recited in claim 17, wherein determining the first intersection between the line and the representation comprises at least:
determining that a first vertex associated with the representation is located on a first side of the line;
determining that a second vertex associated with the representation is located on a second side of the line that is opposite the first side of the line; and
based at least in part on the first vertex being located in the first side of the line and the second vertex being located in the second side of the line, determining that an edge between the first vertex and the second vertex associated with the representation intersects with the line at the first intersection.

19. The method as recited in claim 16, further comprising:
determining, based at least in part on the first portion of the drive area, that a third portion of the drive area is available;
determining one or more first factors associated with the second portion of the drive area;
determining one or more second factors associated with the third portion of the drive area; and
selecting the second portion of the drive area based at least in part on the one or more first factors and the one or more second factors.

20. The method as recited in claim 19, wherein:
the one or more first factors comprise at least one of:
a first length associated with the second portion of the drive area;
a first width associated with the second portion of the drive area;
a first maneuverability of the vehicle associated with parking in the second portion of the drive area;
a first distance between the second portion of the drive area and a destination location for the vehicle; or
a first speed limit associated with the second portion of the drive area; and
the one or more second factors comprise at least one of:
a second length associated with the third portion of the drive area;
a second width associated with the third portion of the drive area;
a second maneuverability of the vehicle associated with parking in the third portion of the drive area;
a second distance between the third portion of the drive area and the destination location for the vehicle; or
a second speed limit associated with the third portion of the drive area.

* * * * *